(12) United States Patent
Zhang et al.

(10) Patent No.: US 10,992,972 B1
(45) Date of Patent: Apr. 27, 2021

(54) AUTOMATIC IDENTIFICATION OF IMPERMISSABLE ACCOUNT SHARING

(71) Applicant: ADOBE INC., San Jose, CA (US)

(72) Inventors: Wei Zhang, Great Falls, VA (US); Chris Challis, Alpine, UT (US)

(73) Assignee: ADOBE INC., San Jose, CA (US)

(*) Notice: Subject to any disclaimer, the term of this patent is extended or adjusted under 35 U.S.C. 154(b) by 220 days.

(21) Appl. No.: 16/731,406

(22) Filed: Dec. 31, 2019

(51) Int. Cl.
| | |
|---|---|
| H04N 21/61 | (2011.01) |
| H04N 21/239 | (2011.01) |
| H04W 4/02 | (2018.01) |
| H04W 4/029 | (2018.01) |
| H04W 64/00 | (2009.01) |
| H04L 29/06 | (2006.01) |
| H04N 21/258 | (2011.01) |
| H04L 29/08 | (2006.01) |

(52) U.S. Cl.
CPC ....... *H04N 21/2396* (2013.01); *H04L 63/107* (2013.01); *H04L 67/306* (2013.01); *H04N 21/25816* (2013.01); *H04N 21/25841* (2013.01); *H04N 21/25875* (2013.01); *H04W 4/023* (2013.01); *H04W 4/029* (2018.02); *H04W 64/006* (2013.01)

(58) Field of Classification Search
CPC ........ H04N 21/2396; H04N 21/25875; H04W 4/029; H04W 4/64
See application file for complete search history.

(56) References Cited

U.S. PATENT DOCUMENTS

| | | | | |
|---|---|---|---|---|
| 8,387,084 B1 * | 2/2013 | Klappert | ............ | H04N 21/4126 725/25 |
| 9,537,880 B1 * | 1/2017 | Jones | .................... | G06F 21/554 |
| 9,843,902 B1 * | 12/2017 | Skudlark | ............... | H04W 64/00 |
| 9,843,920 B2 * | 12/2017 | Scarr | ...................... | G08G 1/012 |
| 9,912,676 B1 * | 3/2018 | Fieldman | ............... | G09B 5/065 |
| 9,917,846 B1 * | 3/2018 | Magi Shaashua | ...... | H04W 4/00 |

(Continued)

OTHER PUBLICATIONS

Wang, et al., "User Identification with a Shared Account: Improving IP-TV Recommender Performance", In: Eastern European Conference on Advances in Databases and Information Systems, pp. 219-233. Springer (2014).

Verstrepen, et al., "Top-N Recommendation for Shared Accounts", In: 9th ACM Conference on Recommender Systems, pp, 59-66. ACM (2015).

(Continued)

*Primary Examiner* — Pankaj Kumar
*Assistant Examiner* — Timothy R Newlin
(74) *Attorney, Agent, or Firm* — F. Chau & Associates, LLC

(57) ABSTRACT

The present disclosure relates to a method for detecting impermissible account sharing among user accounts of a streaming media service including the steps of determining a plurality of locations accessed by a given user account of the user accounts; determining a device access count for each of the locations, the device access count indicating how many times the corresponding location was accessed by at least one device associated with the given user account; identifying one of the locations having the highest device access count as a base location; calculating a risk coefficient for each remaining location; generating a sharing score for the given user account by summing the risk coefficients; and determining impermissible account sharing of the given user account has occurred when the sharing score exceeds a threshold.

19 Claims, 15 Drawing Sheets

(56) References Cited

U.S. PATENT DOCUMENTS

| | | | | |
|---|---|---|---|---|
| 2004/0236702 | A1* | 11/2004 | Fink | H04W 12/12 705/73 |
| 2006/0020960 | A1* | 1/2006 | Relan | H04N 7/1675 725/30 |
| 2007/0232342 | A1* | 10/2007 | Larocca | H04L 67/24 455/518 |
| 2008/0045234 | A1* | 2/2008 | Reed | H04W 8/02 455/456.1 |
| 2009/0300773 | A1* | 12/2009 | Pal | H04N 7/165 726/27 |
| 2010/0291910 | A1* | 11/2010 | Sanding | H04W 8/183 455/418 |
| 2011/0004893 | A1* | 1/2011 | Borislow | H04N 21/25841 725/25 |
| 2012/0174150 | A1* | 7/2012 | Reddy | H04N 21/63345 725/31 |
| 2015/0040148 | A1* | 2/2015 | Lonstein | H04N 21/4333 725/9 |
| 2015/0100589 | A1* | 4/2015 | Hassan | G06F 16/24578 707/748 |
| 2015/0256550 | A1* | 9/2015 | Taylor | H04W 4/023 726/23 |
| 2015/0324616 | A1* | 11/2015 | Alarabi | H04L 63/107 726/25 |
| 2016/0357994 | A1* | 12/2016 | Kanakarajan | H04W 12/1206 |
| 2016/0373442 | A1* | 12/2016 | Bruch | H04W 4/02 |
| 2017/0374560 | A1* | 12/2017 | Judge | H04L 41/145 |
| 2018/0124065 | A1* | 5/2018 | Jurgenson | H04W 12/12 |
| 2018/0262498 | A1* | 9/2018 | Be'ery | H04L 63/1416 |
| 2018/0288066 | A1* | 10/2018 | Brockhuus | H04W 4/029 |
| 2018/0359244 | A1* | 12/2018 | Cockerill | H04L 63/105 |
| 2019/0073676 | A1* | 3/2019 | Wang | G06Q 40/025 |

OTHER PUBLICATIONS

Zhao, Y., et al., "Passenger Prediction in Shared Accounts for Flight Service Recommendation", In: Asia-Pacific Services Computing Conference, pp. 159-172. Springer (2016.

Thomson reuters poll (2014), https://fingfx.thomsonreuters.com/gfx/rngs/USA-TELEVISION-PASSWORDS-POLL/010041YS48H/index.html.

Consumer reports poll (2015), https://www.consummerreports.org/cro/magazine/2015/01/share-logins-streaming-services/index.htm.

GPS Accuracy (2019), https://www.gps.gov/systems/gps/performance/accuracy/.

Farrell, M., Top 25 mvpds (2018), https://www.multichannel.com/news/top-25-mvpds-411157.

Martin, N.: AI Being Used to Bust Those Netflix Account Moochers (2019), https://www.forbes.com/sites/nicolemartin1/2019/01/10/ai-being-used-to-bust-those-netflix-account-moochers.

Sallinas, S.: "Millennials are going to extreme lengths to share streaming passwords, and companies are missing out on millions", (2018), https://www.cnbc.com/2018/08/19/millennials-are-going-to-extreme-lengths-to-share-streaming-passwords-html.

Zhang, A.,et al., "Guessing who rated this movie: Identifying users through subspace clustering"; In: Proceedings of the Twenty-Eighth Conference on Uncertainty in Artificial Intelligence (2012).

Bajaj et al., "Experience Individualization on Online TV Platforms through Persona-based Account Decomposition", In 24th ACM International Conference on Multimedia, pp. 252-256 ACM (2016).

Jiang et al., "Identifying Users behind Shared Accounts in Online Streaming Services", In: The 41st International ACM SIGIR Conference on Research & Development in Information Retrieval, pp. 65-74. ACM (2018).

Kim, S., et al., Household and business detection (2018), https://wiki.corp.adobe.com/pages/viewpage,action?spaceKey=sukim&title=Household+and+buiness+detection.

* cited by examiner

1. Initialization:
   (a) deviceMap ← {}
   (b) userMap ← {}
   (c) nDevices ← 0
2. Go through all session logs, one session at a time, to build userMap:
   (a) Parsing raw data and extract session information, such as userID, deviceID and GPS coordinates $\mathcal{X}$.
   (b) if deviceID ∈ deviceMap then
         get its device index $k$.
       else
         add ( deviceID : nDevices ) to deviceMap
         $k \leftarrow $ nDevices
         nDevices ← nDevices + 1
       end if
   (c) if userID ∈ userMap then
         Merge to the existing entry in userMap:
         if $\mathcal{X} \in$ the associated $LUM$, say $\mathcal{X} = \mathcal{L}_j$ then
           Update $\mathcal{M}_j$:
           if $k \in \mathcal{M}_j$ then
             increase the device usage count in the corresponding element in $\mathcal{M}_j$
           else
             add an new entry $(k:1)$ to $\mathcal{M}_j$
           end if
         else
           add ( $\mathcal{X}$ : $(k:1)$) to the $LUM$
         end if
       else
         create an entry in userMap for this new account
       end if

FIG. 4A (a) Sort the list of *LUMs* by the number of total device uses in each location, in descending order.

(b) $i \leftarrow 0$
while $i \neq P$ do
   Merge neighboring *LUMs* to $(\mathcal{L}_i : \mathcal{M}_i)$:
   for all $(\mathcal{L}_j : \mathcal{M}_j), j > i$ do
     if $dist(\mathcal{L}_i, \mathcal{L}_j) < \sigma$ then
       merge $\mathcal{M}_j$ into $\mathcal{M}_i$ (combine their device usage)
       delete $(\mathcal{L}_j : \mathcal{M}_j)$
       $P \leftarrow P - 1$
     end if
   end for
   $i \leftarrow i + 1$
end while

FIG. 4B

1. Given a list of *Location Usage Map*: $[(\mathcal{L}_0 : M_0), (\mathcal{L}_1 : M_1), \ldots, (\mathcal{L}_N : M_N)]$, ordered by the number of usages, in descending order.
2. $R \leftarrow 1$
3. Set the base location $\mathcal{L} \leftarrow \mathcal{L}_0$. Initiate a "registered" device map $M \leftarrow M_0$.
4. For $i = 1, 2, \ldots, N$:
    (a) Calculate distance weight: $W_d \leftarrow \log_\alpha(\max(dist, \alpha))$, where $dist \leftarrow |\mathcal{L}_i - \mathcal{L}|$ is the distance in miles.
    (b) Let $M_i$ be $[(\mathcal{D}_i^0 : \mathcal{C}_i^0), (\mathcal{D}_i^1 : \mathcal{C}_i^1), \ldots, (\mathcal{D}_i^J : \mathcal{C}_i^J)]$, where $J$ is the number of devices associated with the $i^{th}$ location. $\mathcal{D}_i^j$ is the $j^{th}$ device ID, $\mathcal{C}_i^j$ is the count of usages for the $j^{th}$ device.

for $j = 0, 1, \ldots, J$ do
      $R_j \leftarrow 0$
      if $\mathcal{D}_i^j \in M$, say $\mathcal{D}_i^j = \mathcal{D}^k$ then
        $r \leftarrow \frac{\mathcal{C}_i^j}{\mathcal{C}^k}$
        $R_j \leftarrow R_j + \frac{1}{e^{r(r-\beta)/\eta}+1}$
        $\mathcal{C}^k \leftarrow \mathcal{C}^k + \mathcal{C}_i^j$
      else
        $R_j \leftarrow R_j + 1$
        add $(\mathcal{D}_i^j, \mathcal{C}_i^j)$ to $M$
      end if
    end for (c) $R \leftarrow R + R_j * W_d$
5. Calculate device weight: $W_l \leftarrow \log_\gamma(\max(l, \gamma))$, where $l$ is the total number of devices used in the account.
6. $R \leftarrow R * W_l$
7. Sharing score $S \leftarrow 2 * \frac{1}{e^{-R}+1} - 1$

FIG. 5

AUTOMATIC IDENTIFICATION OF IMPERMISSABLE ACCOUNT SHARING

1. TECHNICAL FIELD

This disclosure relates to techniques for detecting shared accounts, and more particularly to, techniques for detecting shared accounts for streaming service providers.

2. BACKGROUND

Streaming service providers allow users to watch a wide variety of television shows, movies, documentaries or listen to a wide variety of music. A significant number of users share their video or audio streaming accounts outside of their households. Consequently, the streaming industry loses huge potential revenue due to account sharing.

Although service providers have strong financial interests to address account sharing, they face multiple challenges when trying to identify shared accounts. For example, it can take an extremely long time to process the huge volume of data produced by millions of users that are typically associated with a leading streaming service provider. Further, this data can be difficult to parse since it is unstructured and noisy (e.g., missing information and includes numerical errors). Moreover, discovering impermissible account sharing (sharing across households) is extremely difficult since sharing is allowed in certain cases (e.g., sharing within a household). Consequently, many service providers make no attempt to determine which accounts are engaged in impermissible sharing.

SUMMARY

Embodiments of the present disclosure provide techniques for detecting impermissible account sharing (e.g., users sharing their video or audio streaming accounts with individuals outside their household) among user accounts of a streaming media (e.g., movies, music, etc.) service.

At least one exemplary embodiment of the present disclosure provides a method for detecting impermissible account sharing among user accounts of a streaming media service including: determining a plurality of locations accessed by a given user account of the user accounts; determining a device access count for each of the locations, the device access count indicating how many times the corresponding location was accessed by at least one device associated with the given user account; identifying one of the locations having the highest device access count as a base location; calculating a risk coefficient for each remaining location; generating a sharing score for the given user account by summing the risk coefficients; and determining impermissible account sharing of the given user account has occurred when the sharing score exceeds a threshold.

At least one exemplary embodiment of the present disclosure provides an account sharing detection system configured to detect whether a user account is being impermissibly shared. The system includes a cloud-based service configured to execute on a host server, the host server configured to connect to a client device over a computer network. The system further includes a client application program stored in the client device and configured for execution by the client device, the client application program configured to output a plurality of session logs across the computer network to the cloud-based service, where each session log includes a user account identifier (ID) of a user account attempting to access a certain service, a device ID of a device attempting the access, and a location of the device. The cloud-based service is further configured to generate a user map listing each user account ID retrieved from the session logs, a location usage map for each user account ID listed in the user map, and a device usage map for each location listed in the location usage map indicating devices accessed at the corresponding location, and calculate a sharing score for each user account from the user map, the location usage maps, and the device usage maps. The cloud-based service marks a flag for each user account based on how the corresponding sharing score compares to a threshold and enables the client device to access the flags. The flag of a corresponding user account is set to indicate impermissible account sharing when the corresponding sharing score exceeds the threshold.

At least one exemplary embodiment of the present disclosure provides a method for detecting account sharing among user accounts of a streaming media service including: determining a plurality of locations accessed by a given user account of the user accounts; determining a device access count for each of the locations; identifying one of the locations having the highest access count as a base location; for each remaining location, calculating a device score for each device used at the corresponding remaining location based on whether the device has been previously used at the base location, and summing the device scores to generate a risk coefficient; generating an initial score by summing the risk coefficients; calculating a device weight based on a total number of devices associated with the given user account; setting the sharing score to a result of multiplying the initial score by the device weight; and determining impermissible account sharing of the given user account has occurred when the sharing score exceeds a threshold.

BRIEF DESCRIPTION OF THE DRAWINGS

The detailed description describes embodiments with additional specificity and detail through use of the accompanying drawings, briefly described below.

FIG. 4A illustrates an exemplary algorithm that may be used to build the maps according to an exemplary embodiment of the disclosure.

FIG. 4B illustrates an exemplary algorithm that may be used to merge data of the maps originating from the same location according to an exemplary embodiment of the disclosure.

FIG. 5 illustrates an exemplary algorithm used to generate a sharing score for a user account according to an exemplary embodiment of the disclosure.

DETAILED DESCRIPTION OF THE EXEMPLARY EMBODIMENTS

Figure 1A:
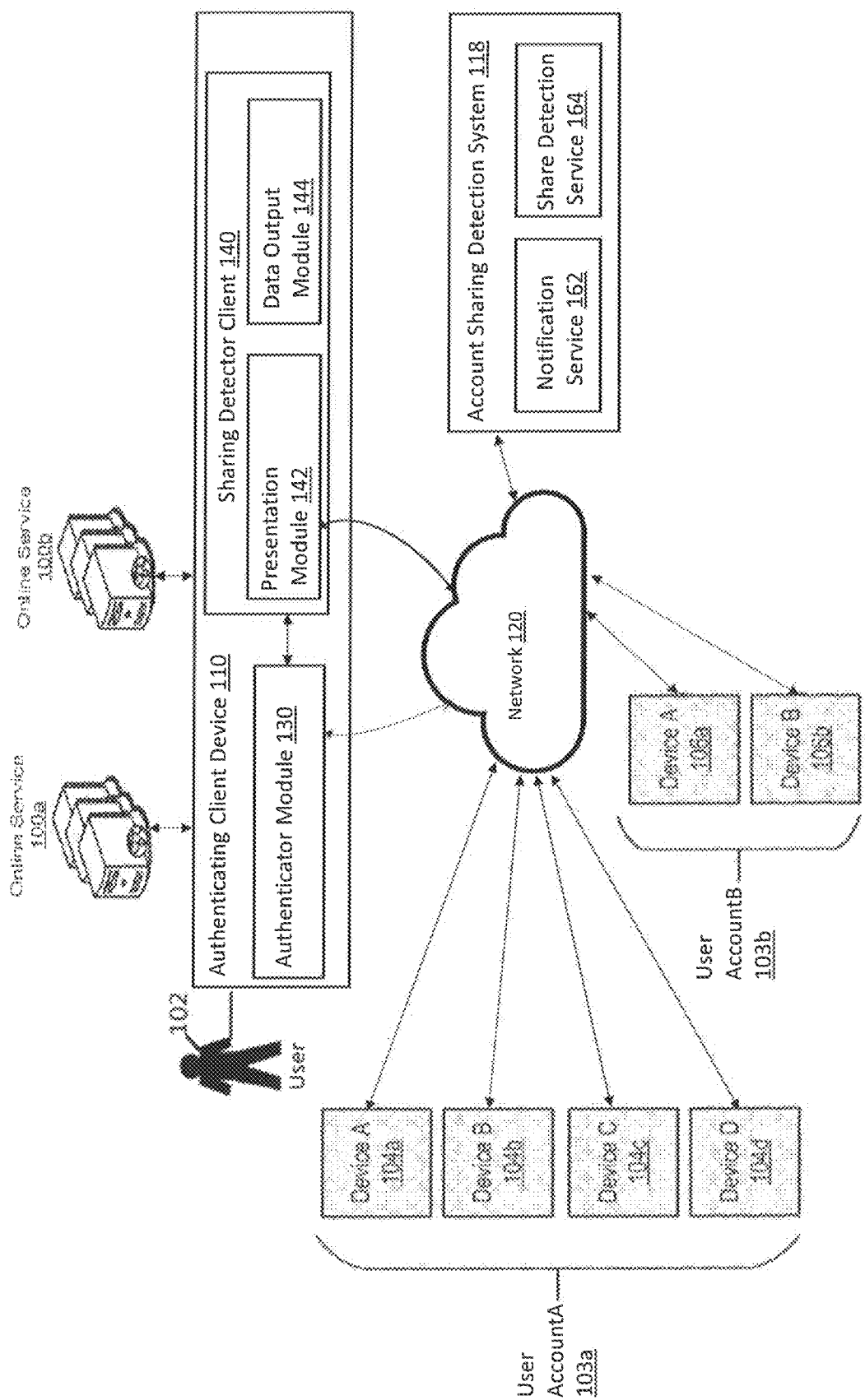
FIG. 1A is a block diagram illustrating a system that detects impermissible sharing of a user account according to an exemplary embodiment of the disclosure.

Streaming providers such as Multichannel Video Programming Distributors (MVPDs) need to authenticate subscribers before streaming video or audio. However, since many subscribers share their streaming accounts with individuals located outside of their household, streaming providers end up unintentionally streaming data to non-subscribers. Thus, streaming providers lose revenue that would have been made from converting these non-subscribers to paying customers, and incur greater costs due to increased bandwidth and server/network loads.

Some streaming service providers have tried to reduce their revenue loss using approaches such as limiting the number of concurrent streaming devices, or asking users to register alimited number of devices to their accounts. However, putting a limit on concurrent streaming can negatively impact family members, who are entitled to share. In addition, limiting concurrent streaming can be easily defeated by sharing at different time periods. Further, limiting accounts to a certain number of registered devices may provide a reduced customer experience.

Other streaming service providers have attempted to detect impermissible account sharing by identifying multiple users by the content they consume using techniques such as collaborative filtering, graph partitions, and topic modelling. One approach uses artificial intelligence and machine learning to identify accounts that are shared. However, this approach may incorrectly flag a user account when members of the household happen to be streaming content at the same time at different locations.

At least one embodiment of the present disclosure provides a method for detecting impermissible account sharing that includes determining locations accessed by a given user account, determining a device access count for each of the locations, identifying one of the locations having the highest device access count as a base location, calculating a risk coefficient for each remaining location, generating a sharing score for the given user account by summing the risk coefficients, and determining whether impermissible account sharing has occurred based on the sharing score. The risk coefficients may consider the distance between the remaining location and the base location, whether a device used at the remaining location has been previously used at the base location, and the total number of devices associated with the given user account. Thus, impermissible account sharing may be detected without falsely flagging a user account of a large family with a large number of concurrent sessions, a user account with family members that travel frequently to locations far from the household, or a user account with family members that frequently upgrade their devices. At least one embodiment of the disclosure can efficiently and quickly process a large amount of data to generate explainable results differentiating between regular users and those engaged in impermissible account sharing, and present these results using interactive graphics, so that customers can understand and trust the results. At least one embodiment of the disclosure identifies impermissible account sharing even when users attempt to hide their actual locations.

The following terms are used throughout the present disclosure:

The term "streaming" may refer to a method of transmitting or receiving data (e.g., video or audio material) over a computer network as a steady, continuous flow, allowing playback to start while the rest of the data is still being received.

The term "HashMap" may refer to a map based collection class that is used for storing key & value pairs, and may be denoted as HashMap<Key,Value>.

The term "Geo-Spoofing" may refer to software based techniques employed to hide the true location of a device and make it seem like the device is located somewhere else.

The term "base location" may refer to a location associated with a user account where devices were used and resulted in a highest overall total number of device uses. For example, if 2 devices were each used 200 times at location A by a user account and 1 device was used at location B 300 times, then location A could be considered the base location of the user account.

The term "remaining locations" may refer to any location associated with the user account other than the base location (e.g., total number of device uses at this location was less than the total number of device uses at the base location).

The term "risk coefficient" may refer to a numerical value indicating a certain amount of risk associated with one of the remaining locations associated with a given user account. A sum of the risk coefficients of the remaining locations being one may indicate a user account that is unlikely to be engaging in impermissible account sharing. As the sum increases beyond one, so does the likelihood that the user account is engaging in impermissible account sharing. For example, the risk coefficient of a remaining location may be calculated by considering the distance between the remaining location and the base location, and considering for each device used at the remaining location whether that device was previously used at the base location.

FIG. 1A is a block diagram depicting a computing environment in which an account sharing detection system 118 (e.g., a host device on a host server) detects whether impermissible account sharing is occurring based on information received from an authenticating client device 110 according to an exemplary embodiment of the disclosure. The computing environment depicts a first user account 103a using one of four devices 104a, 104b, 104c, and 104d to attempt to connect across a computer network 120 to one of two Online Streaming Services (e.g., 100a and 100b) and a second user account 103b using one of two devices 106a and 106b to attempt to connect across the computer network 120 to the Online Streaming Services. The two user accounts 103a and 103b are merely provided as an example, as more than two user accounts may be present. The first user account 103a using 4 devices and the second user account 103b using 2 devices are merely provided as an example, as each user account may use a varying amount of devices. The authenticating client device 110 may include an authenticator module 130 and a sharing detector client 140. The authenticator module 130 determines whether a device (e.g., 104a) that is attempting to access an Online Streaming Service (e.g., 100a) is authorized to access the service, and upon determining that the device is authorized, authorizes the device to access the service. The authenticator module 130 may determine the device is authorized when it is associated with a user account that is listed by the Online Streaming Service as being registered to receive services (e.g., streaming video, streaming audio, etc.). If the Online Streaming Service limits subscribers to certain registered devices, then the authenticator module 130 may determine the device is authorized only if it is one of a plurality of registered devices associated with the user account. The authenticator module 130 may also consider information it receives from the sharing detector client 140 in determining whether to authorize a device to access an Online Streaming Service. For example, if the sharing detector client 140 indicates the user account associated with the device has been flagged for being used for impermissible account sharing (i.e., user is sharing his account with members outside his household), the authenticator module 130 can deny the device access to the Online Streaming Service.

User 102 is illustrated as being a user of the authenticating client device 110. Examples of the user 102 include an employee of a service provider such as a multichannel video programming distributor (MPVD) or an employee of a streaming service such as NETFLIX, DISNEY+, HULU, YOUTUBE, AMAZON PRIME VIDEO, PANDORA, SPOTIFY, etc. In an exemplary embodiment, the user 102 can access data about the user accounts indicating whether the corresponding users are engaging in impermissible account sharing using the sharing detector client 140. The access may include presenting the data in a graphical manner on a window of the device 110 that enables the user 102 to visualize whether impermissible or permissible account sharing is occurring and the severity of the sharing. The presenting of the data in the graphical manner may be performed by the presentation module 142 of the sharing detector client 140. For example, the presented graphics may include a geographical map of an area surrounding locations accessed by devices of the user account overlaid with a circle or pin centered on each of the locations. The radius of the circle may depend on the number of times these devices were used to access the corresponding location during a certain period of time (e.g., the last month). The presented graphics may also include text or graphics that uniquely identify the corresponding subscriber indicating whether the subscriber is considered a regular user or to be involved in impermissible account sharing. Further, the presented graphics may be configured to be interactive. For example, the presented graphics may include a graphical user interface that enables the user 102 to view information on each of the subscribers and interact with the graphics for more information on a particular subscriber. For example, a user 102 selecting on a given pin could dynamically present more information about the corresponding location such as the number of devices used, the types of devices, the number of times each device was used at the location, etc. Thus, the user 102 is given an intuitive and interactive visualization, so that the corresponding customer can understand and trust the results. While a single user 102 is illustrated, embodiments of the disclosure are not limited thereto, and may include multiple users. While a single authenticating client device 110 is illustrated, embodiments of the disclosure are not limited thereto, and may include multiple client devices.

Each of the client device 110 and the account sharing detection system 118 and at least some portion of the communication network 120 are or include one or more programmable devices. These programmable devices may be any of a variety of standardized and special purpose devices, such as personal computers, workstations, servers, cellular telephones, and personal digital assistants. Broadly stated, the network 120 may include any communication network through which programmable devices may exchange information. For example, the network 120 may be a public network, such as the Internet, that is implemented with various IP-based network forwarding devices. The network 120 may also be or include other public or private networks such as LANs, WANs, cellular networks, extranets and intranets.

In some embodiments, the network 120 is configured to communicate (e.g., transmit or receive) information with connected programmable devices, such as the client device 110 and the account sharing detection system 118. The network 120 may be configured to communicate both synchronous information streams and asynchronous information packets. When executing according to its configuration in one example, the network 120 receives streams (e.g., video streams, audio streams) from one or more of the Online Streaming Services 100*a* and/or 100*b* via the authenticating client device 110 for transmission to one or more of the devices (e.g., 104*a*, 104*b*, 106*a*, etc.). When executing according to another configuration, the network 120 receives packets including requests to access an Online Streaming Service (e.g., 100*a* or 100*b*) from the devices (e.g., 104*a*, 106*a*, etc.) for transmission to the client device 110. The requests may include session logs. The network 120 may receive packets including these session logs from the client device 110 for transmission to the account sharing detection system 118. The network 120 may receive packets including information and graphics indicating whether a given user account is impermissibly shared from the account sharing detection system 118 for transmission to the client device 110.

In some embodiments illustrated by FIG. 1A, the client device 110 is configured to execute one or more processes that support a communication session between the client device 110 and the account sharing detection system 118. In these embodiments, the client device 110 is configured to execute one or more processes that transmit packets to the account sharing detection system 118. When executing according to this configuration, the client device 110 implements a variety of components described below with reference to FIG. 2.

Figure 1B:
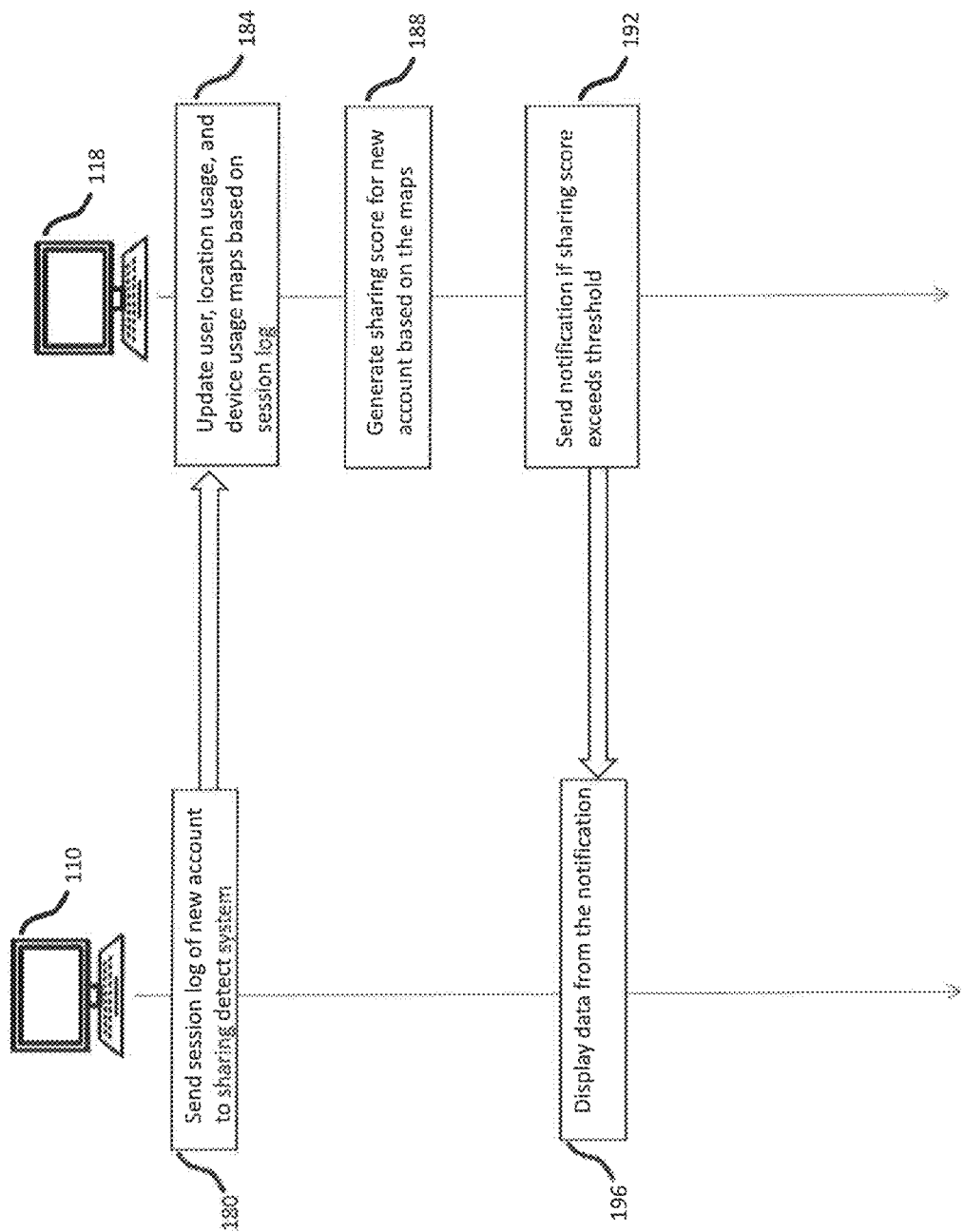
FIG. 1B shows an exemplary workflow of the system according to an exemplary embodiment of the disclosure.

FIG. 1B illustrates an exemplary workflow between the client device 110 and the sharing detection system 118 for detecting a user account that is being impermissibly shared. The workflow includes the client device 110 (e.g., a data output module 144 of client device 140) sending a session log of a new user account to the sharing detection system 118 (step 180). The session log (e.g., a digital file) may include a user account ID associated with an Online Streaming Service (e.g., 100*a*) that uniquely identifies the account of a user from the accounts of other uses of the same Online Streaming Service, a device ID that uniquely identifies the device that is attempting to access the Online Streaming Service from other devices, and a location (e.g., latitude and longitude) of the device. The session log may be sent from the data output module 144 to the share detection service 164 of the sharing detection system 118. The workflow further includes the sharing detection system 118 (e.g., a share detection service 164) updating user, location usage, and device usage maps based on the session log (step 184). Methods for creating and updating the user, location usage, and device usage maps according to embodiments of the disclosure will be discussed in more detail below. The workflow further includes generating a sharing score for the new user account based on the maps (step 188). Methods for generating the sharing score according to embodiments of the invention will be discussed in more detail below. The sharing score need not be generated upon receiving information for a new user account. For example, sharing scores for all user accounts stored in the user map may generated periodically (e.g., every week, every month, etc.) from the user map, location usage maps, and device usage maps. Next, the sharing detection system 118 (e.g., a notification service 162) sends a notification message to the client device 110 if the sharing score exceeds a certain threshold (step 192). The notification message may identify the user account having the sharing score that exceeds the threshold and/or include graphical data that may be used to graphically represent an account that is engaged in impermissible account sharing. For example, the graphical data may include a geographical map of locations accessed by the shared account overlaid with circles centered on these locations whose radius depends on a number of devices accessed at the corresponding location. The workflow further includes the client device 110 (e.g., a presentation module 142) displaying data from the received notification message (step 196). For example, the display data may include the above-described graphical information. The output of a notification message need not be triggered by receipt of information of a new user account. For example, the notification message may be sent out periodically (e.g., every week, every month) and indicate all of the user accounts having sharing scores that exceed the threshold. Further, instead of the account sharing detection system 118 outputting a notification message(s) to the client device 110, the user 102 may use the sharing detector client 140 to access information stored on the detection system 118 about the user accounts including information indicating whether a given user account is considered impermissibly or permissibly shared.

Figure 2:
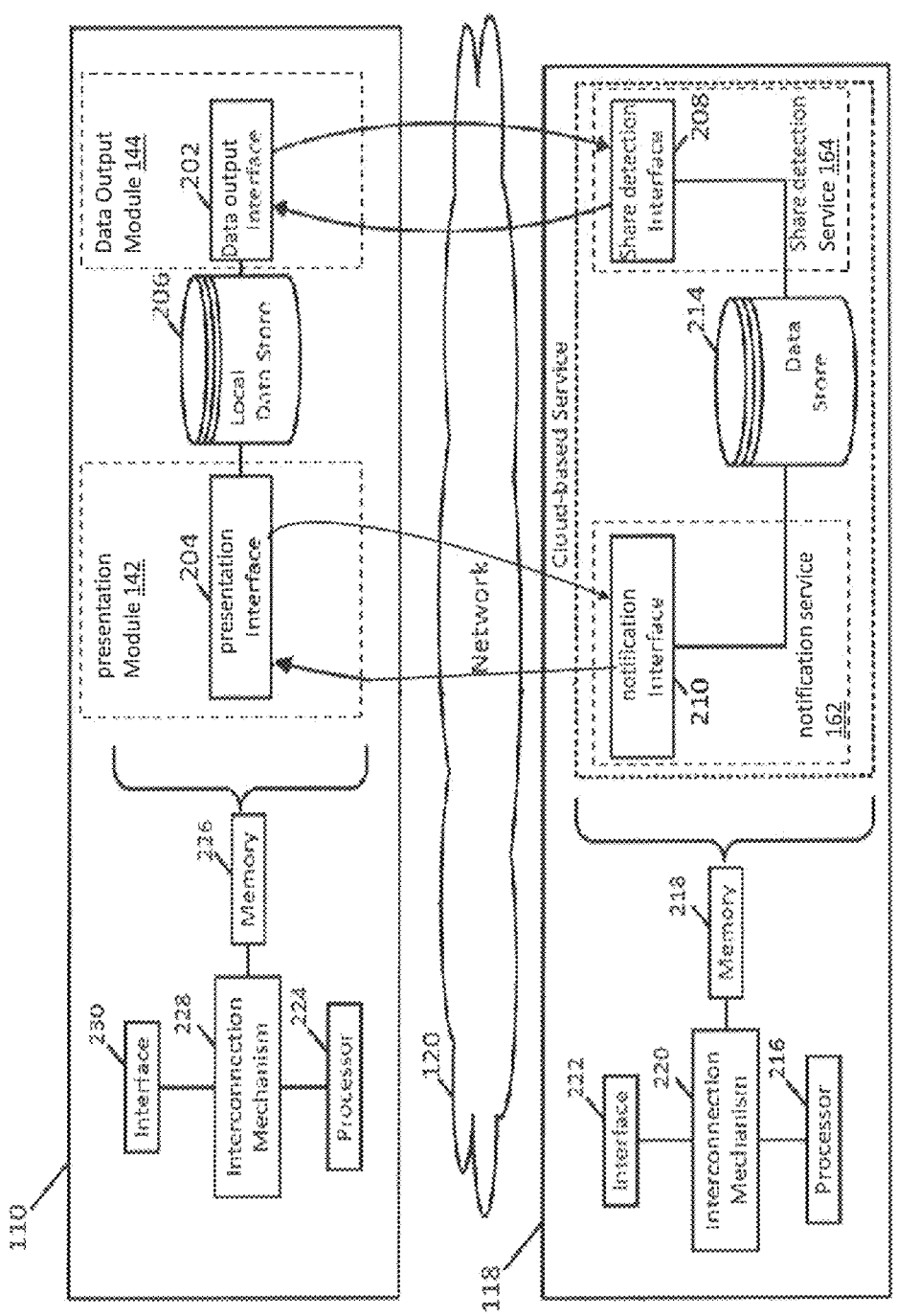
FIG. 2 is a block diagram illustrating an exemplary client device and host device of the system according to exemplary embodiment of the disclosure.

FIG. 2 shows a more detailed view of the client device 110 and the account sharing detection system 118. As shown in FIG. 2, the client device 110 includes a processor 224, a memory 226, an interconnection mechanism 228, a presentation module 142, a data output module 144, and a local data store 206 (e.g., a database). The sharing detection system 118 includes a processor 216, a memory 218, an interconnection mechanism 220, an interface 222, a share detection service (e.g., a software module) 164, a notification service 162 (e.g., a software module), and a data store 214 (e.g., a database). The data output module 144 includes a data output interface 202, the presentation module 142 includes a presentation interface 204, the share detection service 164 includes a share detection interface 208, and the notification service 162 includes a notification interface 210.

As illustrated in FIG. 2, the account sharing detection system 118 and the client device 110 each include a suite of components. These components are the processors 216 and 224, the memory 218 and 226, the interconnection mechanisms 220 and 228, and the interfaces 222 and 230. Although the particular types and models of the standard components may vary between any two of the programmable devices described herein, it is appreciated that each programmable device includes a processor, memory, interconnection mechanism, and an interface as described below.

The interfaces 222 and 230 each include one or more physical interface devices such as input devices, output devices, and combination input/output devices and a software stack configured to drive operation of the devices. Interface devices may receive input or provide output. More particularly, output devices (e.g., display devices, printers, etc.) may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 228 is a communication coupling between the processor 224, the memory 226, and the interface 230. The interconnection mechanism 220 is a communication coupling between the processor 216, the memory 218, and the interface 222. The interconnection mechanisms 228 and 220 may include one or more physical busses in conformance with specialized or standard computing bus technologies such as IDE, SCSI, PCI, and Infini-Band. The interconnection mechanism 228 enables communications, including instructions and data, to be communicated between the processor 224, the memory 226, and the interface 230. The interconnection mechanism 220 enables communications, including instructions and data, to be communicated between the processor 216, the memory 218, and the interface 222.

The memories 226 and 218 include readable and/or writeable data storage that stores programs and data used or manipulated during operation of a programmable device. The programs stored in the memory 226 are a series of instructions that are executable by the processor 224. The programs stored in the memory 218 are a series of instructions that are executable by the processor 216. The memories 226 and 218 may include relatively high performance data storage, such as registers, caches, dynamic random access memory, and static memory. The memories 226 and 218 may further include a relatively low performance, non-volatile data storage medium such as flash memory or an optical or magnetic disk. Various embodiments may organize the memories 226 and 218 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processors 224 and 216 executes a series of instructions (i.e., one or more programs) that result in manipulated data. The processors 224 and 216 may be any type of processor, multiprocessor, microprocessor, or controller known in the art. The processor 224 is connected to and communicates data with the memory 226 and the interface 230 via the interconnection mechanism 228. The processor 216 is connected to and communicates data with the memory 218 and the interface 222 via the interconnection mechanism 220. In an embodiment, the processor 224 causes data to be read from a non-volatile (i.e., non-transitory) data storage medium in the memory 226 and written to high performance data storage. In an embodiment, the processor 216 causes data to be read from a non-volatile (i.e., non-transitory) data storage medium in the memory 218 and written to high performance data storage. The processors 224 and 216 manipulate the data within the high performance data storage, and copies the manipulated data to the data storage medium after processing is completed.

In addition to the standard suite of components described above, both the account sharing detection system 118 and the client device 110 include several customized components. For example, the account sharing detection system 118 includes the notification service 162, the share detection service 162, and the data store 214, and the client device 110 include the presentation module 142, the data output module 144, and the local data store 206.

As discussed above, sharing scores for all user accounts may generated periodically (e.g., every week, every month, etc.) by the share detection service 164 from the user map, location usage maps, and device usage maps. The user map, location usage maps, and device usage maps may have been previously created by the share detection service 164 through analysis of all the session logs received from the client device 110, and stored in datastore 214.

Figure 3:
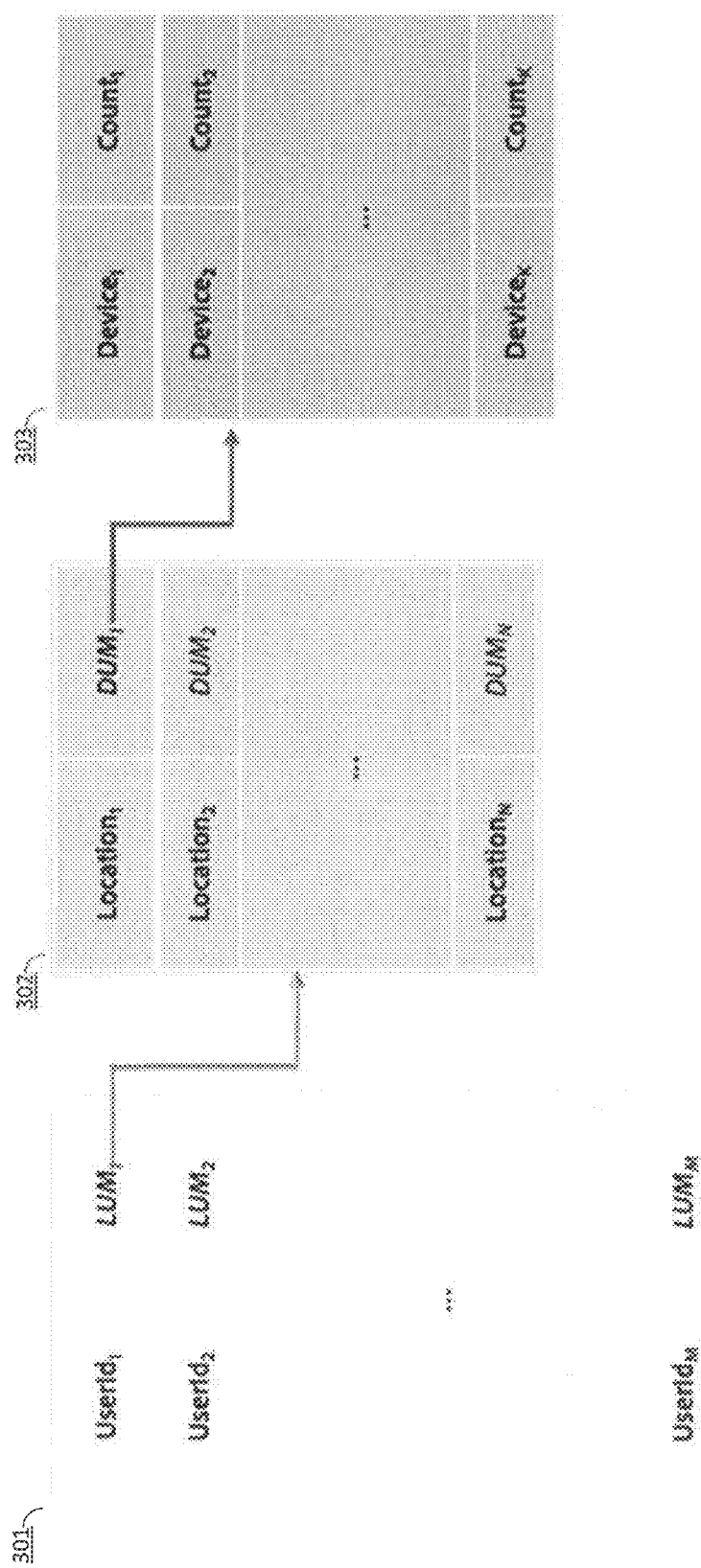
FIG. 3 illustrates exemplary maps used to generate a sharing score according to an exemplary embodiment of the disclosure.

FIG. 3 illustrates an example of a user map 301, a location usage map (LUM) 302 linked to the user map 301, and a device usage map (DUM) 303 linked to the location usage map 302. The device usage map 303 represents a distribution (or list) of device usages with respect to a certain location.

In an embodiment, the device usage map 303 is a hashmap $M=\{(D^0: C^0), (D^1: C^1), \ldots, (D^K:C^K)\}$, where K is the number of devices attached to a location associated with the device usage map 303, $D^K$ is the $K^{th}$ device in the list, $C^K$ is the count (histogram) of usages for the $K^{th}$ device. If an analysis of the session logs discovers that devices have connected (e.g., logged into a certain online service) from 10 distinct locations, then there would be 10 distinct device usage maps (i.e., 1 device usage map for each of the 10 locations). The device usage map 303 associated with a given location may include an entry for each device that connected from the given location. Each entry may include a device identifier that uniquely identifies the device (e.g., $Device_1$, $Device_2$, ..., $Device_K$) and a count (e.g., $Count_1$, $Count_2$, ..., $Count_K$) that indicates how many times the device connected. The count may correspond to a given time period being analyzed. For example, if the session logs indicate that $Device_1$ connected from the given location on 5 different occasions during the previous month and connected from the given location on 9 different occasions during the current month, then the $Count_1$ would be 9 if the given time period being analyzed is the current month and 14 if the given current time period being analyzed is the past two months.

The location usage map 302 represents a distribution (or list) of locations used by a given user account. In an exemplary embodiment, the location usage map 302 is a hashmap in the form $\{(L_0:M_0)(L_1:M_1), \ldots, (L_N:M_N)\}$, where N is the number of locations associated with a given user account, $L_i$ is the $i^{th}$ location (e.g., GPS coordinates), and $M_i$ is the Device Usage Map associated with location $L_i$. The location usage map 302 associated with a user account may include an entry for each location associated with the user account. Each entry may include coordinates of the location and a pointer to a device usage map (e.g., 303) that is associated with the location. For example, as shown in FIG. 3, the first entry of the location usage map 302 includes a first coordinate $Location_1$ and a pointer $DUM_1$ to the first device usage map 303, the second entry includes a second coordinate $Location_2$ and pointer $DUM_2$ to a second device usage map (not illustrated), and an Nth coordinate $Location_N$ and an Nth pointer $DUM_N$ to an $N^{th}$ device usage map (not illustrated). For example, if an LUM is present with only one element: {(40.2814,−111.698): {(4277780:16), (11090085: 2), (77:1)}, it means device #4277780 was used 16 times (e.g., appears in 16 sessions) at a coordinate having latitude (lat) 40.2814 and longitude (lon) −111.698, device #11090085 was used twice at the same coordinate, and device #77 was used once at the same coordinate. Although FIG. 3 only shows one location usage map 302, a location usage map is present for each user account. For example, when a session map is analyzed that includes a new user account ID, a new location usage map is created for the new user account.

The user map 301 stores the profiles of all users. For example, when a session map is analyzed that includes a new user account ID, a new entry is added to the user map 301. Each entry of the user map 301 may include a user account ID (e.g., $UserId_1$, $UserID_2$, ..., User) and a pointer (e.g., $LUM_1$, $LUM_2$, ..., $LUM_M$) to a corresponding location usage map.

For example, the first entry of the user map 301 associated with a first user account $UserId_1$ points to a first location usage map 302, and the first location usage map 302 points to one or more device usage maps (e.g., at least 303). Thus, one entry of the user map 301 can be used to determine all locations and devices associated with a particular user account, as well as the relationship between locations and devices (e.g., which devices are used in which locations). The relationship can be represented as a 2D (location-device) matrix, but the matrix will be very sparse. A user account can have a long list of LUMs due to traveling or account sharing. A location can have a long list of DUMs since a household can have an arbitrary number of devices. Therefore, the 2D matrix can be very big, but with only a small portion of non-zero elements. Thus, a sparse representation may be appropriate. Accordingly, a hashmap can be used to represent these 3 levels of maps: user map, location usage map and device usage map, thereby yielding an efficient approach. For example, searching for keys in these maps may happen in a constant time.

In an exemplary embodiment, the share detection service 164 additionally creates and updates a device map (not shown). In an embodiment, the device map is a hashmap: {(original deviceID: device index), ... }, which represents a mapping from the original deviceID (a string) to an integer value. Checking whether a device is present in the system is more efficient by using the device map. In addition, an integer requires less storage than a string. For example, the entries of the device usage maps may include these integer values instead of the string to identify unique devices and save storage space.

FIG. 4A is an exemplary algorithm that may be used to build the device map, the user map, the location usage maps, and the device usage maps, according to an exemplary embodiment of the disclosure. In part 2 and part 2(a) of the algorithm of FIG. 4, all the session logs are gone through one at a time to build the user map (e.g., userMap). The data output interface 202 of the data output module 144 may interface across the network 120 with the share detection interface 208 to send the session logs to the share detection service 164. For example, session information including an account ID of a user account user (userID), a device ID of a device (deviceID), and a coordinate X are extracted from each session log. In part 2(b) of the algorithm of FIG. 4, if the device ID associated with a user account is already present in the device map (e.g., deviceMap), then its device index is retrieved using the device map, and otherwise the device is added to the device map and the count of devices associated with the user account (e.g., nDevice) is incremented. In part 2(c) of the algorithm of FIG. 4, if the account ID (e.g., userID) is already present in the user map (e.g., userMap) and the coordinate X corresponds to an existing entry in the corresponding location usage map, then the device usage map associated with the entry is updated. For example, if an entry in the device usage map with the device ID (e.g., deviceID) is already present, its count is incremented and otherwise an entry is added to the device usage map for the device ID with a count of 1. If the account ID (e.g., userID) is already present in the user map (e.g., userMap) and the coordinate X does not correspond to an existing entry in the corresponding location usage map, an entry is added to the location usage map having the coordinate X. If the account ID (e.g., userID) is not already present in the user map (e.g., userMap), then a new entry is added to the user map having the account ID.

A single location has a certain coordinate X as its center and some minimum radius. However, since a GPS may have some error and is typically not accurate below 7-8 meters, it may produce coordinates that are inadvertently interpreted as being part of different locations, when they should instead be treated as the same single location. Thus, the exemplary algorithm of FIG. 4B may be used to combine neighboring locations within a location usage map and to combine device usage maps associated with these neighboring locations. If two entries within a location usage map are less than a certain distance a (e.g., 25 meters, 50 meters, etc.) away from each other, then these entries are merged into a single entry and their device usages (e.g., device usage maps) are combined. For example, if the first entry $Location_1$ and the second entry $Location_2$ of location usage map 302 are combined into a single entry, then the pointers $Dum_1$ and $Dum_2$ would be replaced with a single pointer that points to a combined device usage map that results from combining the first device usage map 303 with the second device usage map associated with the second entry $Location_2$. For example, if $Device_1$ of the device usage map 303 has a $Count_1$ of 5 and an entry of the second device usage map has the same device with a count of 4, then the merged device usage map includes an entry for $Device_1$ with a count of 9.

The maps (e.g., device map, user map, location usage maps, and device usage maps) may be stored in the data store 214. Once the maps have been created, the sharing detection service 164 can perform an operation on the maps to calculate a sharing score for each unique user account ID within the user map.

FIG. 5 illustrates an exemplary algorithm used to generate the sharing score for a user account according to an exemplary embodiment of the disclosure. In part 1 of the algorithm of FIG. 5, the location usage map associated with the user account is sorted in descending order according to the total device usage count at each of the locations within the location usage map. The sorting may be performed by referencing the device usage maps associated with each entry of the location usage map. For example, if a first device usage map associated with a first location within the location usage map includes three devices each used 3 times (i.e., 9 total uses), a second device usage map associated with a second location within the location usage map includes two devices each used 5 times (i.e., 10 total uses), and a third device usage map associated with a third location within the location usage map includes two devices each used 7 times (i.e., 14 total uses), then the third location is ordered first, the second location is ordered second, and first location is ordered third since 14>10>9. Part 3 of the algorithm of FIG. 5 sets the base location to the location that is listed first according to the descending sort (e.g., the third location) and creates a map of registered devices from the devices of the base location. Part 4 of the algorithm of FIG. 5 goes through all of the locations other than the base location (i.e., the remaining locations) to generate a risk coefficient for each of the remaining locations. For a current one of the remaining locations, part 4(a) of the algorithm of FIG. 5 calculates a distance weight $W_d$ from the distance (dist) between the base location and the remaining location.

In an exemplary embodiment, the distance weight $W_d$ is generated by determining a maximum of a pre-defined minimum distance a and dist, and performing a logarithm function on the maximum. In an exemplary embodiment, the base of the logarithm function is the pre-defined minimum distance a. In an exemplary embodiment, the pre-defined minimum distance a is 50 miles, but is not limited thereto. In part 4(b) of the algorithm of FIG. 5, a device score is calculated for each of the devices associated with the current one of the remaining locations. If a current one of the devices is not one of the registered devices (not part of the registered device map), then its score is set to 1 and the device is added to the registered device map. For example, devices never used at the base location are considered more risky and thus receive a higher score. If the current device is one of the registered devices, then its score will be less than 1 and depend on its number of uses $C^j$ at the current location and its total number of uses $C^k$ encountered so far. For example, if the device was used at the base location 4 times and used at the current location 5 times, then $C_j=5$ and $C^K=9$ (4+5). In an exemplary embodiment, the device score of the registered device at the current location is based on a value $r=C^j/C^k$. In an exemplary embodiment, the device score is set to $1/e^{-(r-\beta)/3}+1$, where $\beta$ is greater than or equal to 1. The device scores are summed to generate a risk coefficient for the current location. In an exemplary embodiment, the risk coefficient is weighted by a distance weight $W_d$. For example, the distance weight $W_d$ may be multiplied by the risk coefficient to generate a weighted risk coefficient risk. Part 4 of the algorithm is then repeated for each of the remaining locations to generate a corresponding risk coefficient or weighted risk coefficient. For example, the application of the distance weight is optional in certain embodiments. In part 5-6 of the algorithm of FIG. 5, the risk coefficients are summed to generate a sum, the sum is multiplied by a device weight W to generate a value R, and a sharing score S is determined from the value R. Use of the device weight is optional. For example, in an alternate embodiment, the sharing score S is generated from a sum of the risk coefficients (weighed or non-weighted). In an embodiment, the device weight $W_t$ is generated from maximum of a pre-defined minimum device weight γ and a total number of devices t used by the user account. For example, if the user account is associated with 10 different unique devices, then t=10. The total number of devices t may be calculated by counting the unique devices among the device usage maps associated with the location usage map of the user account. In an exemplary embodiment the sharing score $S=(2*(1/e^{-(R-1)}+1))-1$ for normalizing its range to a value between 0 and 1.

The algorithm of FIG. 5 may estimate a score (risk) of a user account being impermissibly shared, by checking the device usage counts of all locations other than the base location. If a device is not in the list of registered devices (e.g., it is a new device never used in the base location), it is more likely to be used by outsiders (users not belonging to the household). If the device appears in the list, but is used much more often in other locations than the base location, it is also possibly an outsider's device (e.g., a friend who visits occasionally), although the probability is much lower than an unregistered device. The risk of sharing may be fairly low when the outside usage is not significantly higher than usage at the base location. In an exemplary embodiment, @ is set to be 20. That is, when the usage in other locations is 20 times as high, the device score is increased by 0.5. A higher device score leads to a higher value R, which ultimately leads to a higher sharing score S. A discussed above, a device score of a registered device may be set to a mathematical expression such as $1/e^{-(r-\beta)/3}+1$. In the expression, $r-\beta$ may be divided by 3 so the logistic curve does not saturate too quickly.

The algorithm of FIG. 5 considers the distribution of locations when estimating each sharing score S. The distance weight $W_d$ was introduced because uses far apart are more likely to be due to account sharing. For example, household members may go to their office or school and stream video every day, but are less likely to go to the other side of the world. When a is set to 50, the distance weight $W_d$ has no effect in the algorithm of FIG. 5 for usages within 50 miles. However, usages in locations which are hundreds of miles away will be penalized and lead to higher scores.

Even if all streaming sessions appear to happen in the base location, it is still possible that the account is shared since people can fake their location by Geo-Spoofing. The device weight $W_t$ in the algorithm of FIG. 5 may be used to discover accounts or devices engaged in Geo-Spoofing. The higher the number of devices, the higher the device weight $W_t$. So even if all streaming sessions share the same location, the sharing score S will still be higher if there is an extremely large number of devices. In an exemplary embodiment, the pre-defined minimum device weight $\gamma$ is set to 20 but is not limited thereto. For example, when $\gamma$ is set to 20 and the base of the logarithm function is set to $\gamma$, the distance weight $W_t$ becomes 2. If the user account's location usage map has only one location (all sessions happen in one location), the final score would be 0.46. If the number of devices is less than $\gamma=20$, the distance weight $W_t$ is always 1 since the $\log_{20}(20)=1$. For user accounts with just one location and less than 20 devices, their R value are always 1. When an R value of 1 is plugged into an expression such as $(2*(1/e^{-(R-1)}+1))-1$, these user accounts receive a sharing score S of 0, which signifies a safe account.

Figure 6:
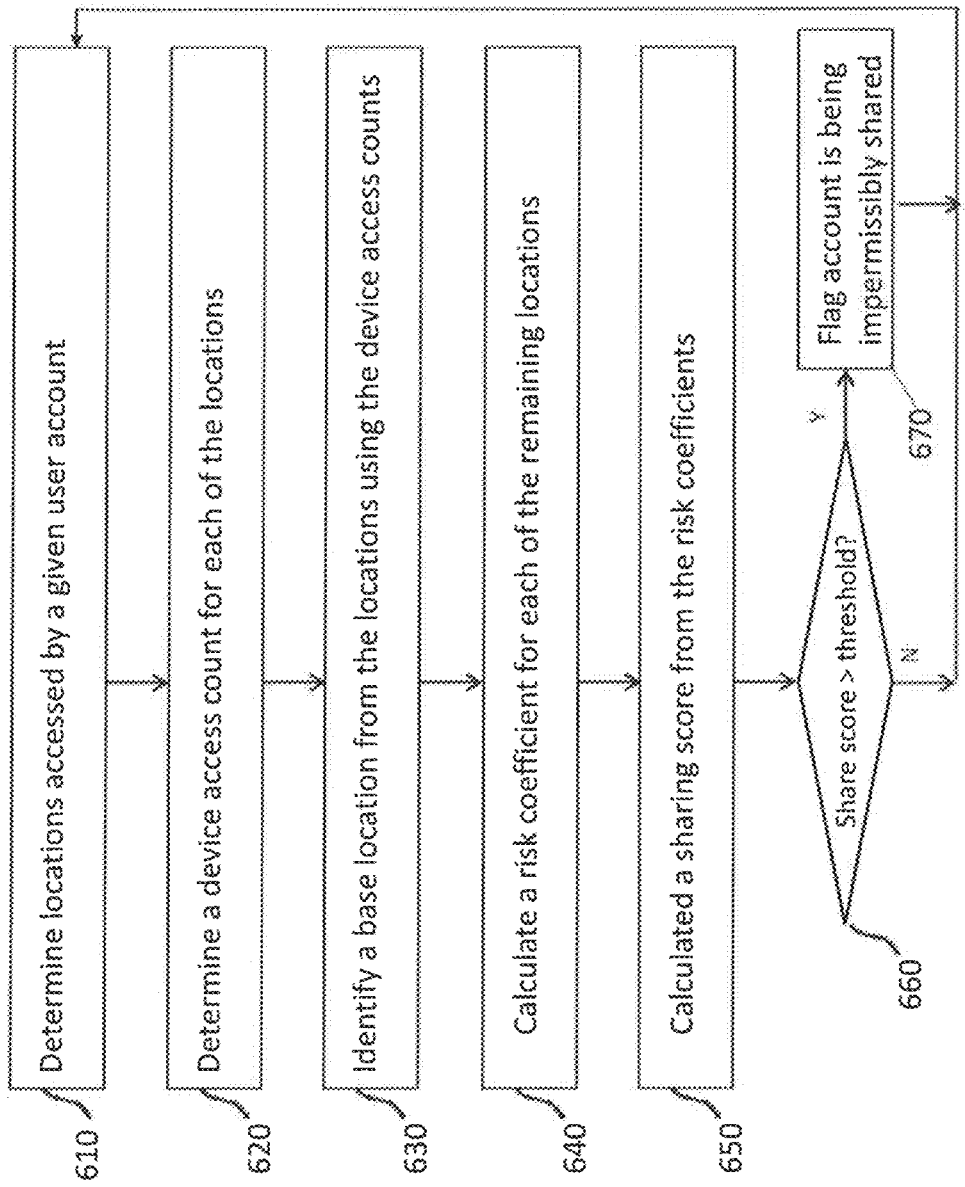
FIG. 6 illustrates a method of determining whether a user account is impermissibly shared according to an exemplary embodiment of the disclosure.

FIG. 6 illustrates a method of determining whether a user account is impermissibly shared according to an exemplary embodiment of the disclosure. The method is derivable from the algorithm of FIG. 5. The method of FIG. 6 includes determining locations accessed by a given user account (step 610). For example, the share detection service 164 pay perform this step using the user map, location usage maps, and the device usage maps stored in data store 214. For example, the share detection service 164 may access an entry of the user map 301 associated with an account ID of the user account to retrieve a pointer to a location usage map and then retrieve the locations from the location usage map. The method of FIG. 6 further includes determining a device access count for each of the locations (step 620). For example, the share detection service 164 may retrieve the pointers in the location usage map, use the retrieved pointer to retrieve the corresponding device usage maps, and tally up the counts of each of the retrieved device usage map to determine the device access counts. The method of FIG. 6 further includes identifying a base location from the locations using the device access counts (step 630). For example, the share detection service 164 may identify the base location as the location having the maximum device access count among the determined access accounts. The method of FIG. 6 further includes calculating a risk coefficient for each of the remaining locations (step 640). Thus, a risk coefficient is not calculated for the base location. The method of FIG. 6 further includes calculating a sharing score S from the risk coefficients (step 650). The method of FIG. 6 further includes determining whether the sharing score S is greater than a certain threshold (step 660). If the sharing score S is greater than the threshold, then the user account is flagged as being impermissibly shared (step 670). For example, each entry in the user map 301 could include a flag that is initially cleared (e.g., 0) and then set (e.g., to 1) by the share detection service 164 upon determining the user account has a sharing score S that exceeds the threshold. The method of FIG. 6 can then be repeated on other user accounts.

Figure 7:
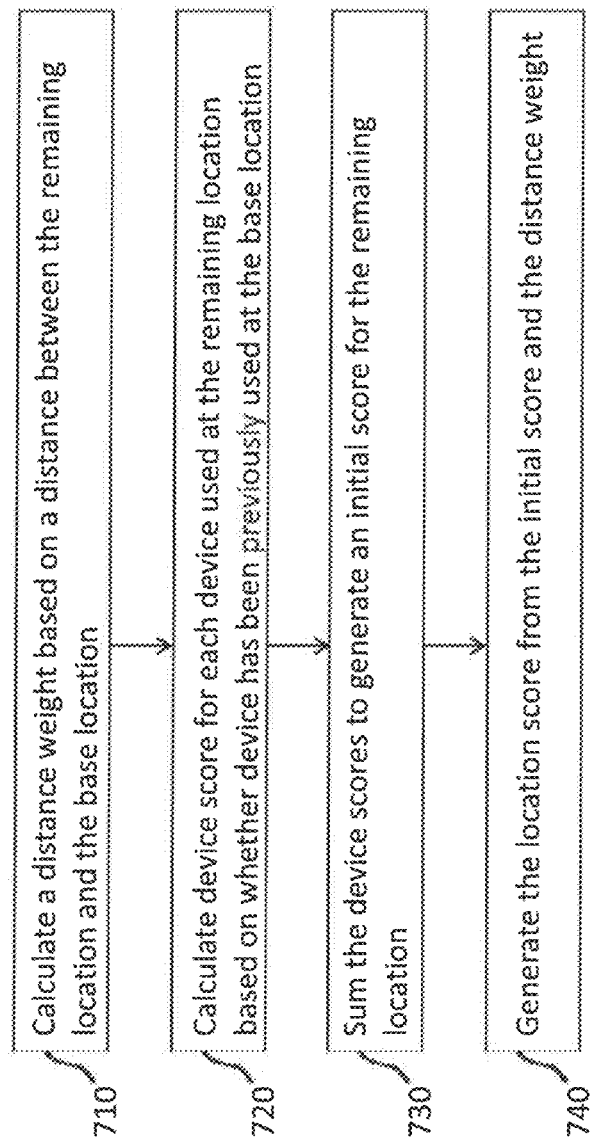
FIG. 7 illustrates a method of generating a risk coefficient that may be used in the method of FIG. 6 according to an exemplary embodiment of the disclosure.

FIG. 7 illustrates a method of generating a risk coefficient that may be used in the method of FIG. 6 according to an exemplary embodiment of the disclosure. For example, step 640 of FIG. 6 may be performed using the method of FIG. 7 to determine the risk coefficient of a remaining location (i.e., a location other than the base location). The method of FIG. 7 includes calculating a distance weight $W_d$ based on a distance between the remaining location (step 710). For example, the share detection service 164 can calculate the distance weight $W_d$ in a same manner as that shown in the algorithm of FIG. 5. The method of FIG. 7 further includes calculating a device score for each device used at the remaining location based on whether device has been previously used at the base location (step 720). For example, the share detection service 164 could set the device score to 1 if the device has been used before at the base location and to a value less than 1 based on its number of uses at the remaining location $C^j$ and its total uses $C^k$ so far (e.g., $1/e^{-(r-\beta)/3}+1$ where $r=C^j/C^k$) when the device has been used before at the base location. The method of FIG. 7 further includes summing the device scores to generate an initial score for the remaining location (step 730). The method further includes generating the risk coefficient from the initial score and the distance weight (step 740). For example, the share detection service 164 may calculate the risk coefficient by multiplying the distance weight by the initial score.

Figure 8:
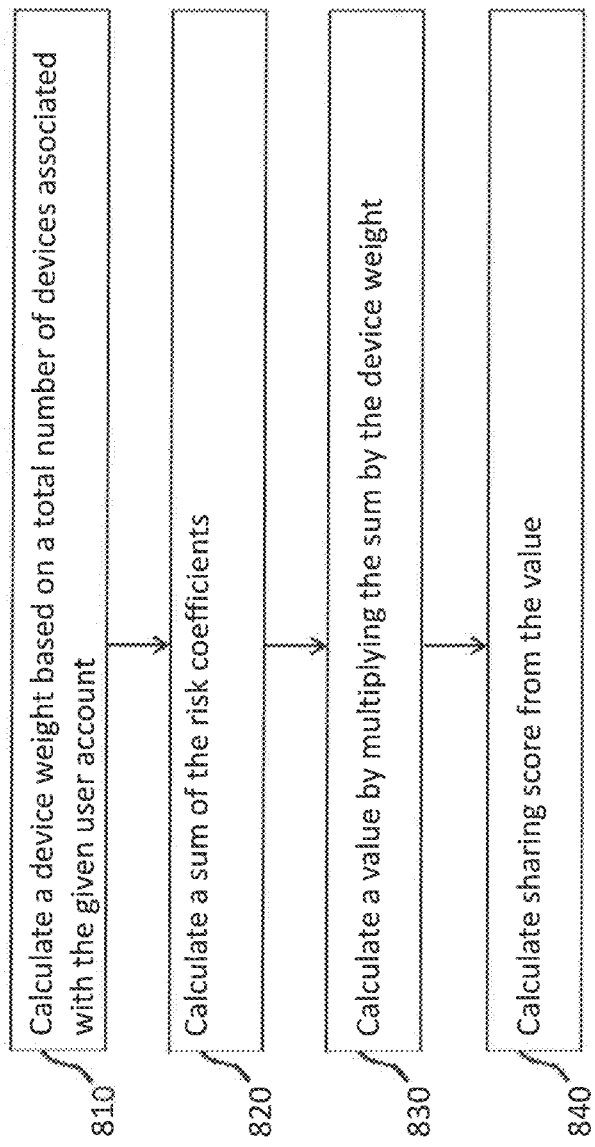
FIG. 8 illustrates a method of generating a sharing score that may be used in the method of FIG. 6 according to an exemplary embodiment of the disclosure.

FIG. 8 illustrates a method of generating a sharing score that may be used in the method of FIG. 6 according to an exemplary embodiment of the disclosure. For example, step 650 of FIG. 6 may be performed to calculate the sharing score S. The method of FIG. 8 includes calculating a device weight W based on a total number of devices associated with the given user account (step 810). For example, the share detection service 164 could calculate the device weight $W_t$ in the same manner shown in the algorithm of FIG. 5. The method of FIG. 8 further includes calculating a sum of the risk coefficients (step 820), and calculating a value by multiplying the sum by the device weight $W_t$ (step 830). The method of FIG. 8 further includes calculating a sharing score S from the value (step 840). For example, when the value is R, the sharing score S may calculated according an expression such as $(2*(1/e^{-(R-1)}+1))-1$.

A notification interface 210 of the notification service 162 may search the data store 214 to find a user account having a certain sharing score (above or below a certain threshold), and then send information across the network 120 to the presentation interface 204 of the client device 110 about the user account and the sharing score. For example, the information may include at least one of account identifier of the user account (e.g., account number, name on account, email address, etc.), a flag indicating whether the account is shared, the sharing score, and graphical data including an image of a map including locations accessed by the user account overlaid with pins or circles centered at these locations that are indicative of a device usage count at these locations. The presentation interface 204 may store the received user account information in data store 206. The presentation module 142 may present the graphical data on a display device of the client device 110. A user 102 may also use the presentation interface 204 to access the notification service 162 to retrieve the user account information and present the user account information on the display device.

Figure 9A:
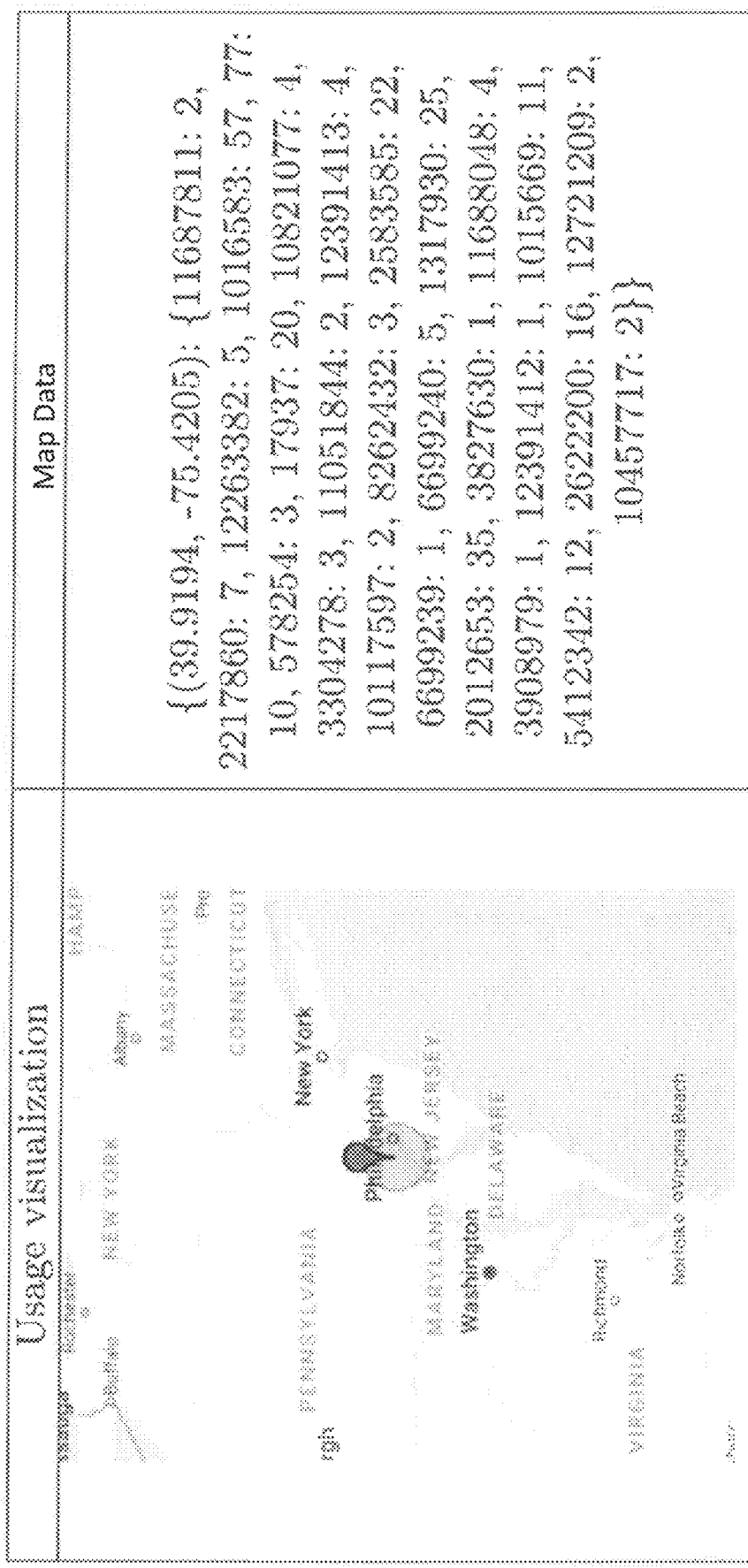
FIGS. 9A, 9B, 9C, and 9D illustrate examples of graphical data associated with user accounts that may be presented to visualize account sharing.
Figure 9B:
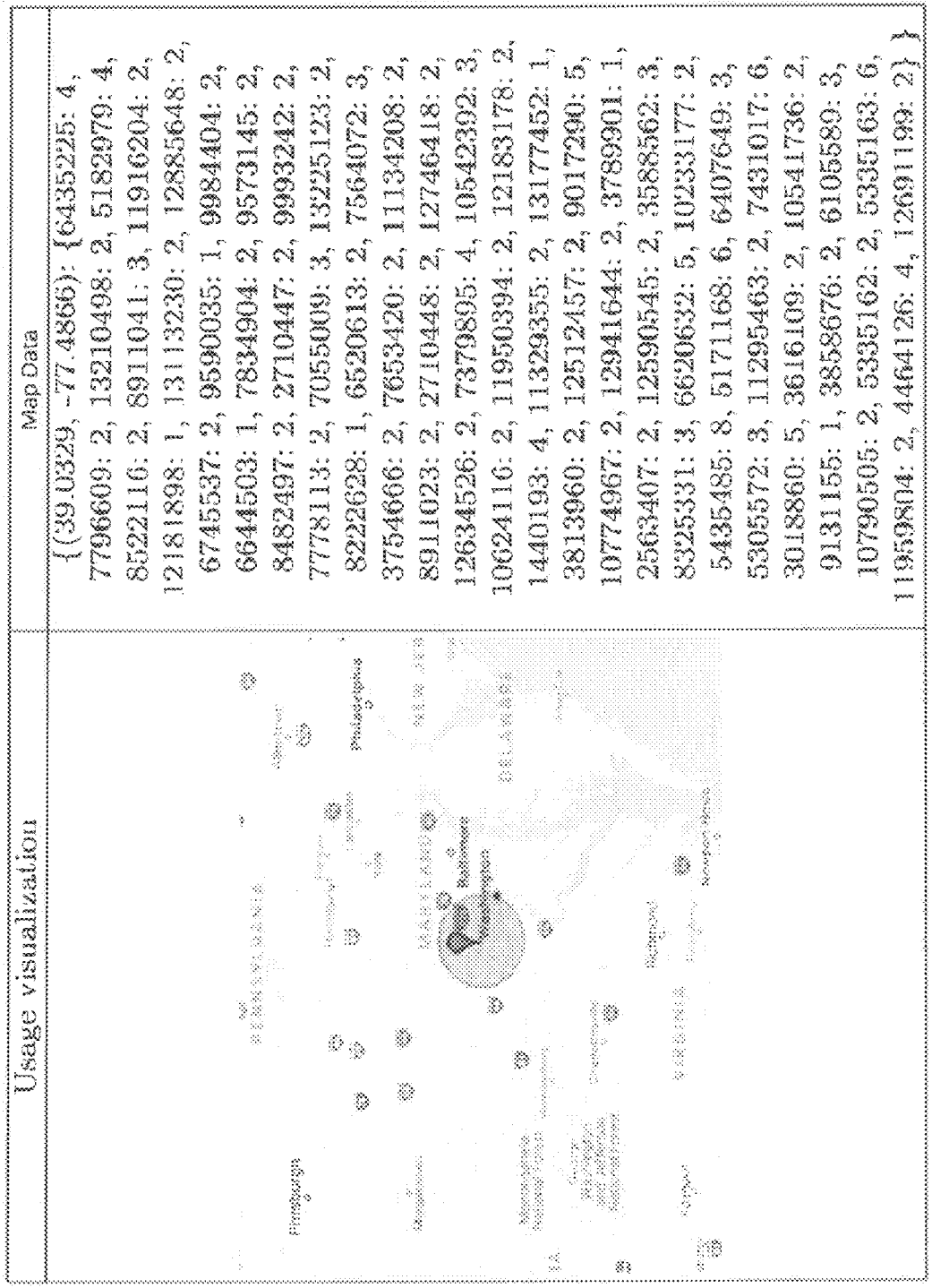
Figure 9C:
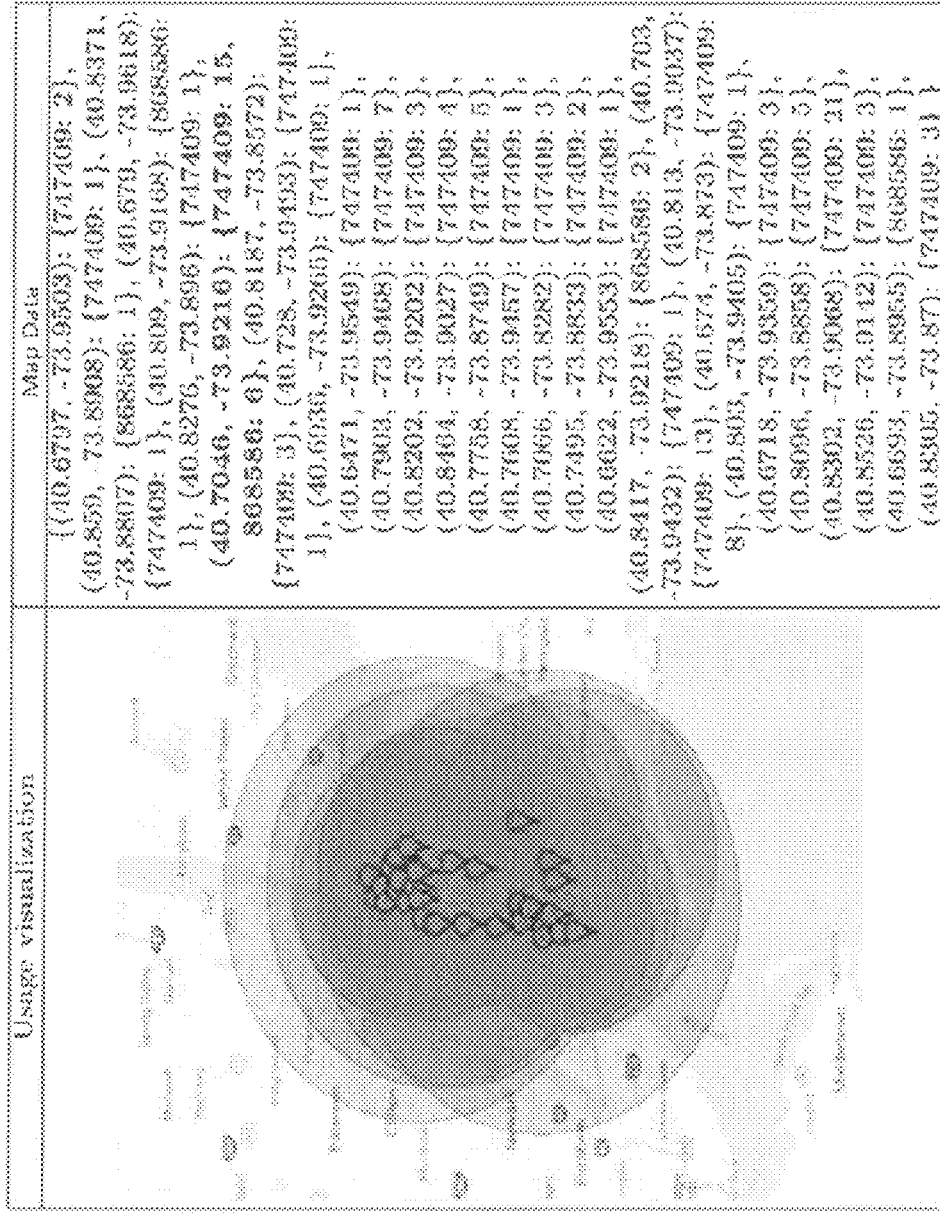
Figure 9D:
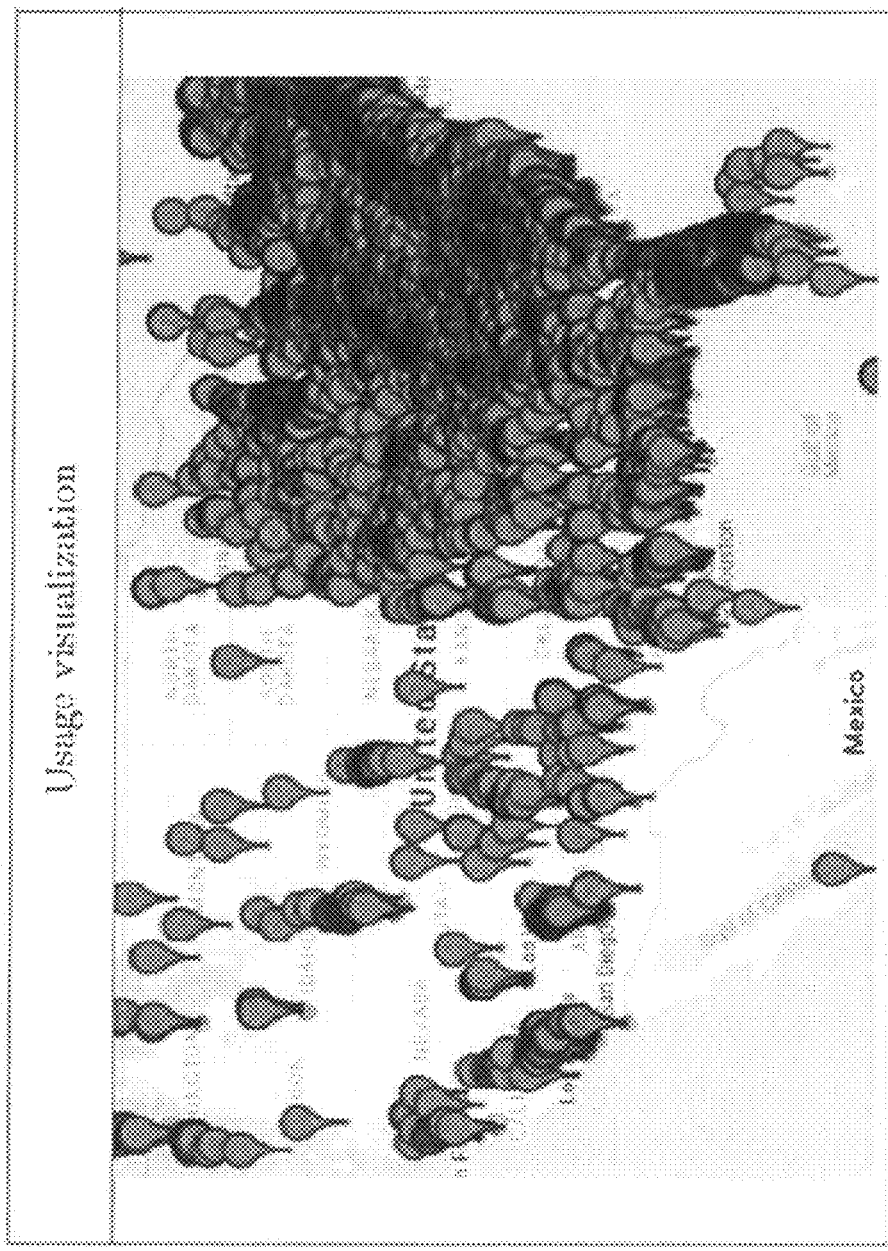

FIGS. 9A, 9B, 9C, and 9D show examples of the graphical data associated with a user account that may be presented on the display device and the map data (e.g., from location usage map and device usage maps) associated with the user account. The bigger the circle in the graphical data, the larger the number of usages (sum of all device usages in that location). In an exemplary embodiment, the size of the circle (e.g., radius) is not linearly proportional to the number of usages. For example, the radius of the circle may be based on a natural logarithm of the number of usages. In FIG. 9A, the user account has been used by 27 devices in the same base location with a sharing score of 0.05, which is likely to indicate a legitimate account. In FIG. 9B, while the user account has been used in just one location, since it has been used by 72 devices it receives a sharing score of 0.21 to indicate that geo-spoofing may be occurring. In FIG. 9C, the user account has been used in many locations in and around New York City, but nevertheless is identified as a regular account. The user account has two devices (ID 747409 and 868586) associated with it. The base location is (40.7046, −73.9216) where device #747409 was used 15 times and device #868586 was used 6 times. Both devices were used in other locations, suggesting that they were taken to travel around. The account sharing score is relatively low for this case (only 0.01) and it is labeled as a safe account. The score is not 0 though, because it is possible that a friend visited the account holder's base location (probably home) multiple times with device #868586, thus he/she got the device registered to the account and lowered the account sharing score. Nevertheless, the probability is very low in comparison with other shared accounts. If the sharing score is updated monthly with incoming data, next month device #868586 will not be registered with the account if the friend no longer brings it to the account holder's base location. As a result, the sharing score would then become much higher according to the algorithm of FIG. 5, as the device is not used in the base location. This would cause the account to be labeled as impermissibly shared, which is the desired result. FIG. 9D is an example of a user account with a sharing score that has been determined to be indicative of impermissible sharing. For example, FIG. 9D illustrates 33,909 devices have been used with this account over a 3-month period.

The algorithms of FIG. 4A, FIG. 4B, and FIG. 5 can be executed in parallel so the computations can be split. For example, the computations can be split based on user account IDs. A first processing node (e.g., a first computer or processor) can operate the algorithms on a first group of user accounts (e.g., a first batch) while a second processing node (e.g., a second computer or processor) operates the algorithms on a second group of user accounts (e.g., a second batch). The processing of the data may be split into more than two batches (e.g., 8 batches, 16 batches, etc.). When the processing is split, it may be necessary to synchronize the device map across batches. In another embodiment, when the processing is split, each node maintains its own device map.

The type of location may be used to augment the sharing score. For example, an account that streams from two or more residential locations is more likely to be an impermissibly shared account; while streaming from a home and a business is more likely to be valid account.

The type of the device (e.g., "mobile", "computer", or "gameconsole") used at a given location may be used augment the sharing score. For example, it is normal to move around and stream videos using a "mobile" device. On the other hand, using "gameconsole" devices in multiple locations is more likely due to account sharing.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or datalink can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless datalinks, or by a combination of hardwired and wireless datalinks) through a network, both perform tasks. In a distributed system environment, program modules may be located in both local and remote memory storage devices.

Embodiments of the present disclosure can also be implemented in cloud computing environments. For example, the notification service 162, data store 214, and share detection service 164 may be located in the cloud or provided by a cloud-based service. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
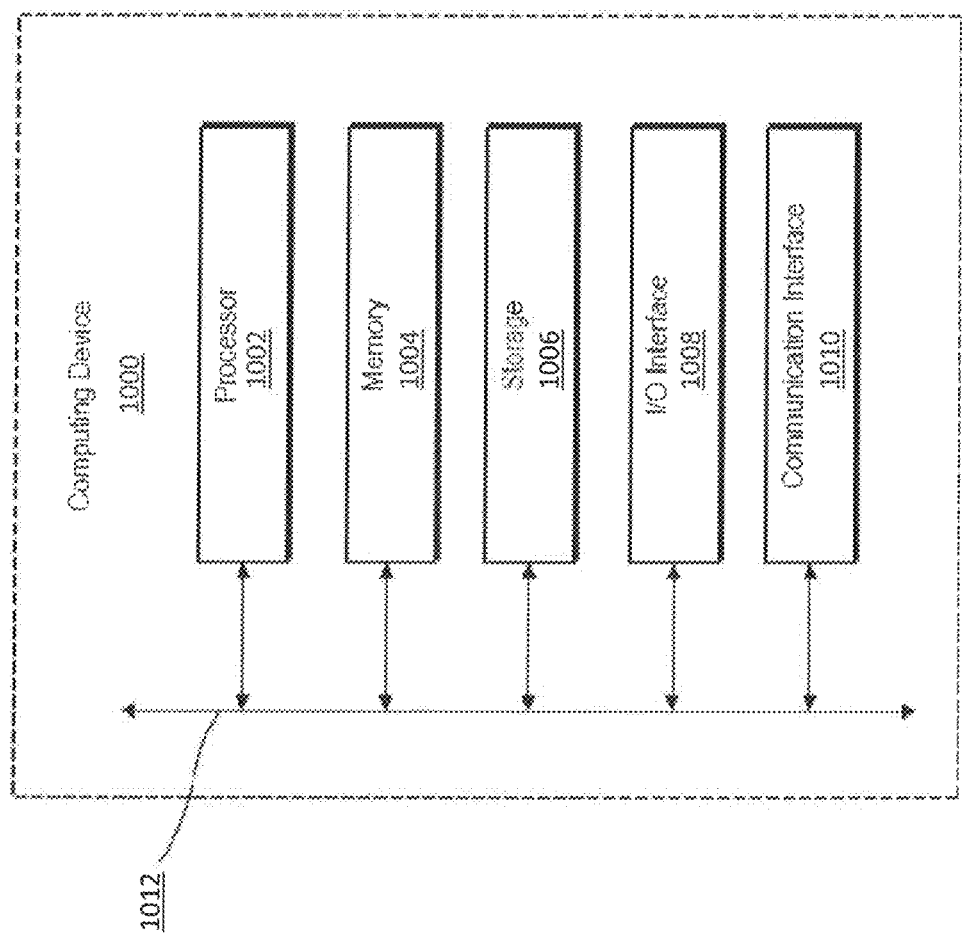
FIG. 10 illustrates an exemplary computing device that may be used to perform one or more methods of the disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the client device 110 or the system 118). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device 110). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

At least one method or system of the disclosure for determining impermissible account sharing is highly efficient since it capable of processing over 3 months of data with 30 million users in a week using a single machine, with other 2 million shared accounts detected. Further, at least one embodiment of the disclosures provides explainable results to users. For example, as shown in FIGS. 9A-D, each processed subscriber may be labelled as shared or regular within an intuitive and interactive illustration (e.g., web-based). Further, the illustration may obfuscate the device IDs of the devices, thereby preserving customer privacy. Embodiments of the disclosure may be applied to ADOBE PRIMETIME as well as other video streaming services such as NETFLIX, HULU, etc. Further, embodiments of the disclosure may be applied to other applications such as music streaming and subscription-based software (e.g., PHOTOSHOP, ACROBAT, etc.).

As discussed above, a computer-implemented method for detecting impermissible account sharing calculates a risk coefficient for locations other than the base location (i.e., the remaining locations) and generates a sharing score based on the risk coefficients. For example, the risk coefficient may be calculated by calculating a distance weight based on a distance between a remaining location and the base location; calculating a device score for each device used at the remaining location based on whether the device has been previously used at the base location; summing the device scores to generate an intermediate score for the remaining location; and generating the risk coefficient from the intermediate score and the distance weight. For example, the distance weight may be calculated by determining a maximum of the distance and a pre-defined minimum distance, and applying a logarithmic function to the maximum. For example, the sharing score may be generated by calculating a device weight based on a total number of devices associated with a given user account; and multiplying a result of summing the risk coefficients by the device weight to generate a value R. For example, the sharing score may be set to $(2*(1/e^{-(R-1)}+1))-1$. For example, the device weight may be calculated by determining a maximum of a total number of devices used at a location and a pre-defined minimum number of devices, and applying a logarithmic function to the maximum. For example, the calculating of the device score for a device at a location may be performed by setting the device score to 1, when the corresponding device has not been previously used at the base location; and setting the device score to a value based on a number of uses J of the corresponding device at the location and a total number of uses K of the corresponding device observed so far, when the corresponding device has been previously used at the base location, J and K are >=1. For example, the value may be set to $1/(e^{-(J/K-\beta/3)}(+1))$, where $\beta>=1$. The method may further include presenting a map including a circle centered at each of the locations having a radius based on a natural logarithm of the corresponding device access count. The method may need to determine all the locations accessed by a given user account. For example, this may be performed by accessing a user map by a user identifier (ID) of the given user account to retrieve a location usage map ID; and accessing a location usage map associated with the location usage map ID to retrieve the locations. The method may need to determine a device access count for a given location accessed by a device. For example, this may be performed by accessing an entry of the location usage map associated with the given location to retrieve a device usage map ID; accessing a device usage map associated with the device usage map ID to retrieve a plurality of device access counts; and setting the device access count to a sum of the retrieved device access counts.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for detecting impermissible account sharing among user accounts of a streaming media service, the method comprising:
    determining a plurality of locations accessed by a given user account of the user accounts;
    determining a device access count for each of the locations, the device access count indicating how many times the corresponding location was accessed by at least one device associated with the given user account;
    identifying one of the locations having the highest device access count as a base location;
    calculating a risk coefficient for each remaining location;
    generating a sharing score for the given user account by summing the risk coefficients; and
    determining impermissible account sharing of the given user account has occurred when the sharing score exceeds a threshold.

2. The method of claim 1, the calculating of the risk coefficient comprises:
    calculating a distance weight based on a distance between the remaining location and the base location;
    calculating a device score for each device used at the remaining location based on whether the device has been previously used at the base location;
    summing the device scores to generate an intermediate score for the remaining location; and
    generating the risk coefficient from the intermediate score and the distance weight.

3. The method of claim 2, wherein the distance weight is calculated by determining a maximum of the distance and a pre-defined minimum distance, and applying a logarithmic function to the maximum.

4. The method of claim 1, wherein the generating of the sharing score comprises:
    calculating a device weight based on a total number of devices associated with the given user account; and
    multiplying a result of the summing of the risk coefficients by the device weight to generate a value R; and
    determining the sharing score from the value R.

5. The method of claim 4, wherein the sharing score is $(2*(1/e^{-(R-1)}+1))-1$.

6. The method of claim 4, wherein the device weight is calculated by determining a maximum of the total number of devices and a pre-defined minimum number of devices, and applying a logarithmic function to the maximum.

7. The method of claim 2, wherein the calculating of the device score for each device used at the remaining location comprises:
setting the device score to 1, when the corresponding device has not been previously used at the base location; and
setting the device score to a value based on a number of uses J of the corresponding device at the remaining location and a total number of uses K of the corresponding device observed so far, when the corresponding device has been previously used at the base location,
where J and K are >=1.

8. The method of claim 7, wherein the value is $1/(e^{-(J/K-\beta)/3}+1)$, where $\beta>=1$.

9. The method of claim 1, further comprising presenting a map including a circle centered at each of the locations having a radius based on a natural logarithm of the corresponding device access count.

10. The method of claim 1, wherein determining the plurality of locations accessed by the given user account, comprises:
accessing a user map by a user identifier (ID) of the given user account to retrieve a location usage map ID; and
accessing a location usage map associated with the location usage map ID to retrieve the locations.

11. The method of claim 10, wherein determining the device access count for a given location among the locations comprises:
accessing an entry of the location usage map associated with the given location to retrieve a device usage map ID;
accessing a device usage map associated with the device usage map ID to retrieve a plurality of device access counts; and
setting the device access count to a sum of the retrieved device access counts.

12. An account sharing detection system configured to detect whether a user account is being impermissibly shared, the system comprising:
a cloud-based service configured to execute on a host server, the host server configured to connect to a client device over a computer network; and
a client application program stored in the client device and configured for execution by the client device, the client application program configured to output a plurality of session logs across the computer network to the cloud-based service, each session log including a user account identifier (ID) of a user account attempting to access a certain service, a device ID of a device attempting the access, and a location of the device,
wherein the cloud-based service is configured to generate a user map listing each user account ID retrieved from the session logs, a location usage map for each user account ID listed in the user map, and a device usage map for each location listed in the location usage map indicating devices accessed at the corresponding location,
wherein the cloud-based service is configured to calculate a sharing score for each user account from the user map, the location usage maps, and the device usage maps,
wherein the cloud-based service marks a flag for each user account based on how the corresponding sharing score compares to a threshold and enables the client device to access the flags,
wherein the flag of a corresponding user account is set to indicate impermissible account sharing when the corresponding sharing score exceeds the threshold
wherein the cloud-based service formats a graphical map for the given user account including a circle centered at each of the locations having a radius based on a natural logarithm of the corresponding access count, and enables the client device to access the graphical map.

13. The account sharing detection system of claim 12, wherein the sharing score for a given user account is calculated by:
determining a plurality of locations from the location usage map associated with a user account ID of the given user account;
determining an access count for each of the determined locations from the device usage maps associated with the location usage map;
identifying one of the locations having the highest access count as a base location;
for each remaining location,
calculating a distance weight based on a distance between the corresponding remaining location and the base location;
calculating a device score for each device used at the corresponding remaining location based on whether the device has been previously used at the base location;
summing the device scores to generate a risk coefficient for the remaining location;
generating a weighted risk coefficient from the risk coefficient and the distance weight; and
setting the sharing score based on a sum of the weighted risk coefficients.

14. The account sharing detection system of claim 13, wherein the sharing score is further calculated by:
calculating a device weight based on a total number of devices associated with the given user account;
multiplying the sum by the device weight to generate a value R; and
setting the sharing score from the value R.

15. The account sharing detection system of claim 14, wherein the sharing score is set to $(2*(1/e^{-(R-1)}+1))-1$.

16. A computer-implemented method for detecting impermissible account sharing among user accounts of a streaming media service, the method comprising:
determining a plurality of locations accessed by a given user account of the user accounts;
determining a device access count for each of the locations;
identifying one of the locations having the highest device access count as a base location;
for each remaining location,
calculating a device score for each device used at the corresponding remaining location based on whether the device has been previously used at the base location, and summing the device scores to generate a risk coefficient;

generating an initial score by summing the risk coefficients;

calculating a device weight based on a total number of devices associated with the given user account;

setting the sharing score to a result of multiplying the initial score by the device weight; and determining impermissible account sharing of the given user account has occurred when the sharing score exceeds a threshold.

17. The method of claim 16, wherein the sharing score is based on the result R according to $(2*(1/e^{-(R-1)}+1))-1$.

18. The method of claim 16, wherein the calculating of the device score for each device used at the corresponding remaining location comprises:

setting the device score to 1, when the corresponding device has not been previously used at the base location; and setting the device score based on a number of uses J of the corresponding device at the corresponding location and a total number of uses K of the corresponding device observed so far, when the corresponding device has been previously used at the base location, where J and K are >=1.

19. The method of claim 18, wherein the device score is $1/(e^{-(J/K-\beta)/3}+1)$, where $\beta>=1$.

* * * * *